Feb. 20, 1962 M. J. MITCHELL 3,021,658
HITCH STRUCTURE FOR TRACTOR MOUNTED HARVESTERS
Filed May 21, 1959 4 Sheets-Sheet 1

INVENTOR.
MELVILLE J. MITCHELL
BY Wolfe, Hubbard,
Voit & Osann
ATTORNEYS.

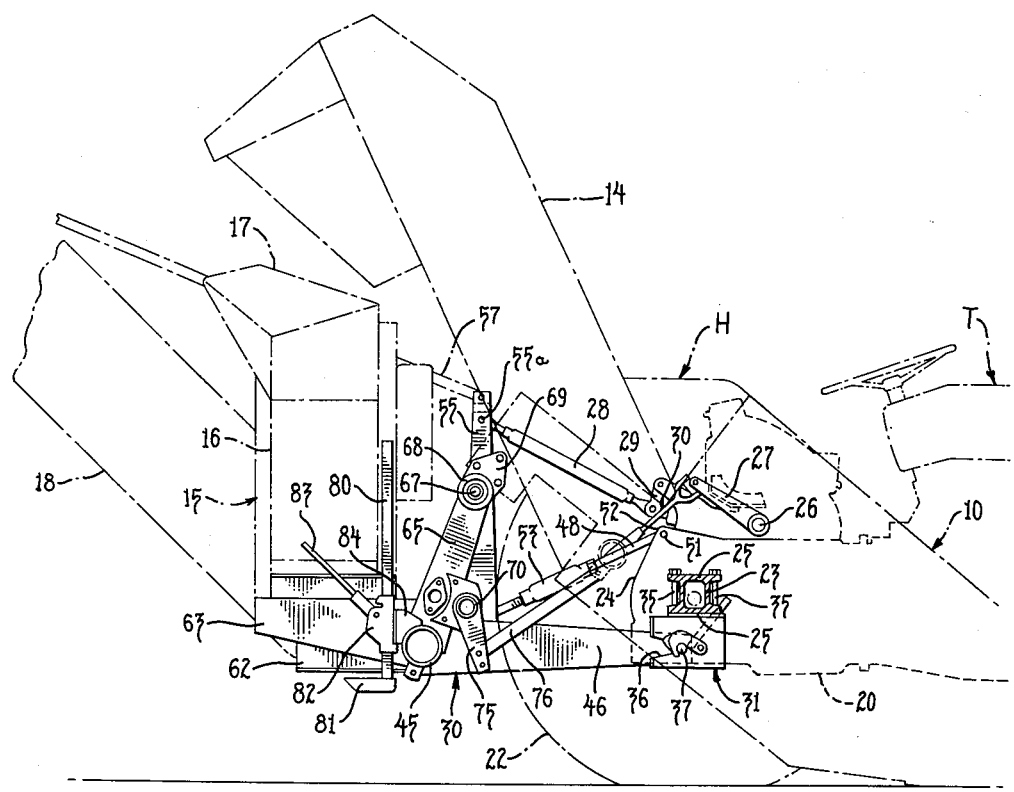
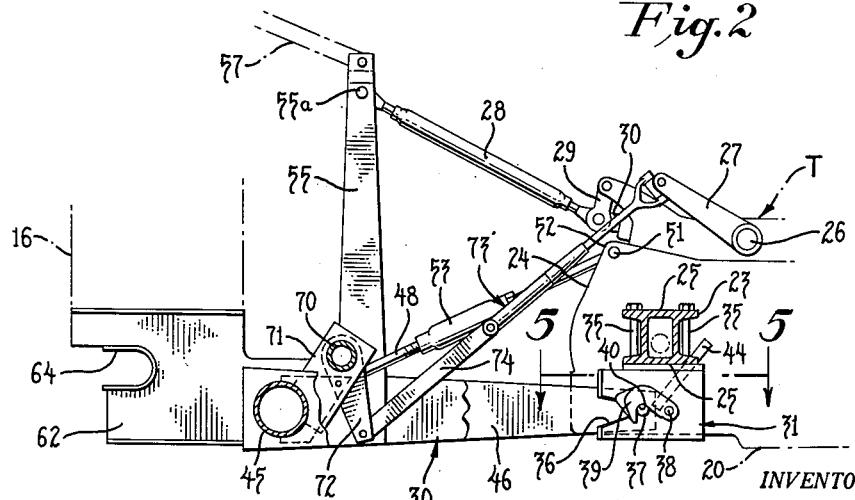
Fig. 2
Fig. 3
INVENTOR.
MELVILLE J. MITCHELL
BY
ATTORNEYS.

INVENTOR.
MELVILLE J. MITCHELL
BY
Wolfe, Hubbard, Voit & Osann
ATTORNEYS.

Feb. 20, 1962 M. J. MITCHELL 3,021,658
HITCH STRUCTURE FOR TRACTOR MOUNTED HARVESTERS
Filed May 21, 1959 4 Sheets-Sheet 4

INVENTOR.
MELVILLE J. MITCHELL
BY
Wolfe, Hubbard, Voit & Osann
ATTORNEYS.

United States Patent Office 3,021,658
Patented Feb. 20, 1962

3,021,658
HITCH STRUCTURE FOR TRACTOR MOUNTED HARVESTERS
Melville J. Mitchell, Birmingham, Mich., assignor to Massey-Ferguson Inc., Racine, Wis., a corporation of Maryland
Filed May 21, 1959, Ser. No. 814,727
3 Claims. (Cl. 56—15)

The invention relates to row crop harvesters of the tractor mounted type and more particularly to an improved hitch structure for mounting such harvesters on a tractor.

One object of the invention is to provide a hitch structure of the above general character which makes the mounting and detachment of the harvester a quick and easy one-man job.

Another object is to provide a hitch structure which utilizes the power operated hitch elevating mechanism or power lift of the tractor for raising and lowering the crop gathering section of the harvester between working and transport positions.

A further object is to provide a simple, sturdy hitch structure having a minimum number of parts permanently mounted on the tractor and in which such parts are simple and compact and interfere in no way with the normal operation of the tractor when the harvester is detached.

Other objects and advantages of the invention will become apparent from the following detailed description of the preferred embodiment illustrated in the accompanying drawings in which—

FIG. 2 is a fragmentary side elevational view of the tractor-implement combination shown in FIG. 1.

FIG. 3 is a fragmentary vertically sectional view through the hitch structure taken in a plane substantially on the line 3—3 of FIG. 1.

Figure 1:
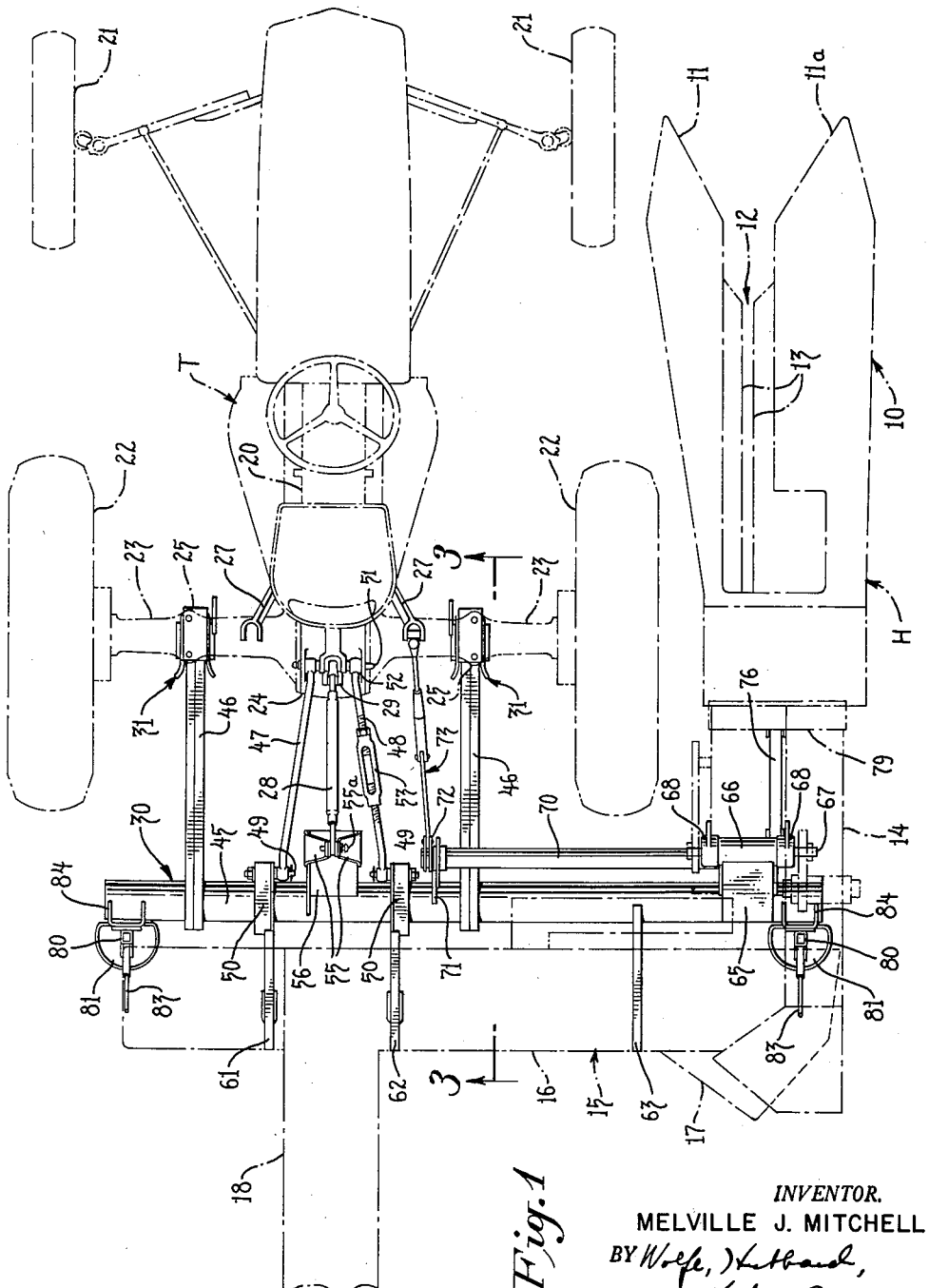
FIGURE 1 is a top view of a harvester and tractor coupled by a hitch structure embodying the features of the invention, conventional parts of the tractor and harvester being shown in broken lines.

While a single preferred embodiment of the invention has been shown and will be described herein, there is no intention to limit the invention to details of the illustrative embodiment. The intention is to cover all modifications and adaptations falling within the spirit and scope of the invention as more broadly or generally characterized in the appended claims.

For purposes of illustration, the invention has been shown in a form suitable for mounting a row crop harvester H on a tractor T but it will be understood that the invention may be used as well with other types of harvesters and tractors. The particular harvester shown is a single row corn harvester or corn picker. It has a gathering head or unit 10 with inner and outer gathering points 11, 11a at its front end defining a stalkway 12. Rotatably driven harvesting rolls 13 extending along opposite sides of the stalkway operate in well-known manner to remove ears from the standing cornstalks engaged in the stalkway. The ears are carried rearwardly by gathering chains or the like to a conveyor 14 which elevates and delivers them to a crop treating unit 15, in this instance, a husking mechanism, supported at the rear of the tractor.

The crop treating husking unit 15 includes conventional husking mechanism enclosed in a generally rectangular casing 16. A hopper 17 at one end of the casing is positioned to receive the ears or other crop material delivered by the conveyor 14. The treated crop material or husked ears are discharged from the husking mechanism to a conveyor 18 which elevates them and carries them back to a suitable vehicle towed behind the tractor-implement combination.

When the harvester is mounted on a tractor the gathering head 10 is adapted to extend along the side of the tractor while the rear or husking unit 15 is disposed at the rear of the tractor. While the harvester may be mounted on various types of tractors, the tractor T shown will be recognized as a "Ferguson" tractor. It has an elongated body 20 carried by steerable front wheels 21 and rear drive wheels 22. The latter are supported at the outer ends of the axle housing 23 projecting laterally from opposite sides of the tractor center housing 24.

In tractors of the type illustrated, the rear axle housings 23 are conventionally formed with upper and lower mounting pads 25 for attachment of auxiliary equipment. Such tractors are also equipped with a three-link trailing implement hitch linkage and power actuated means or a power lift such as a hydraulic ram for raising and lowering the hitch linkage and an attaching implement. The power actuated means acts through a transverse lift shaft 26 (FIGS. 2 and 3) journalled on the tractor body and having radially extending crank arms 27 splined at opposite ends. In the normal operation of the tractor the arms 27 are operatively connected with the lower or draft links of the hitch linkage by suitable drop links. When the tractor is to be used with the harvester H the draft links and at least one of the drop links are detached. A third or top link 28 of the hitch linkage which is pivoted at its forward end to a rocker 29 and a control plunger 30 for the tractor hydraulic lifting is retained for use in coupling the harvester to the tractor as will appear presently.

In accordance with one aspect of the invention, the improved hitch structure comprises a rigid assembly or frame 30 including means for supporting both the gathering unit 10 and the husking unit 15 of the harvester and means equipped with coupling elements for quick and easy attachment to the tractor. Additionally, two coupling members 31 (FIGS. 2, 3, 5 and 6) are provided for mounting on the tractor and those members remain in place whether or not the harvester is coupled to the tractor. The coupling members in this instance are constructed and arranged for mounting on the lower pads 25 of the rear axle housings 23. They are particularly characterized by their simple, compact construction which allows them to remain in place without in any way interfering with or limiting the normal operation of the tractor.

Figure 5:
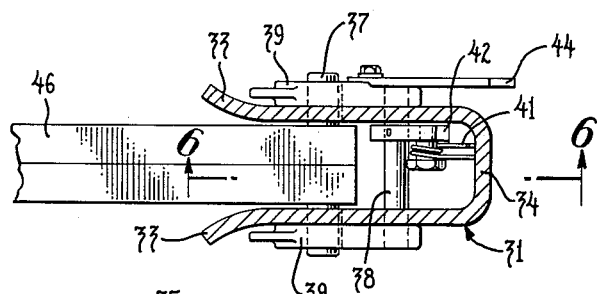
FIG. 5 is an enlarged fragmentary sectional view through one of the coupling elements of the hitch structure taken in a plane substantially on the line 5—5 of FIG. 3.
Figure 6:
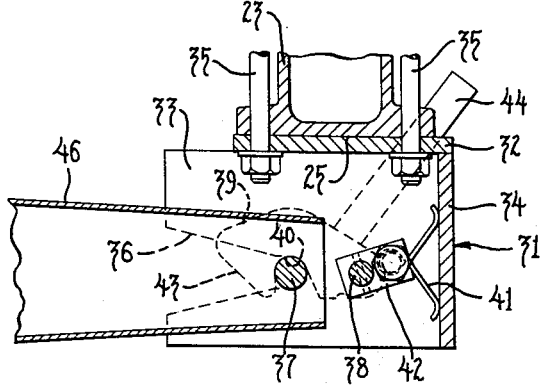
FIG. 6 is a fragmentary sectional view of the coupling element taken in a plane substantially on the line 6—6 of FIG. 5.

Referring more particularly to FIGS. 5 and 6 of the drawings, the coupling members 31, which are alike, each comprise a rigid boxlike body having a top wall 32, side walls 33 and one end wall 34. The top wall is apertured for the reception of bolts 35 by which the coupling member is secured to the axle housing pad 25 in depending relation and with its open end facing rearwardly.

As shown in FIGS. 2, 3 and 6, the side walls 33 of the accompanying member are formed with rearwardly opening notches 36 with their closed front ends rounded to define sockets for seating coupling pins 37 constituting a part of the coupling means carried by the frame 30. Preferably, the notches 36 are tapered so as to present a relatively wide mouth at their open ends to insure entry of the coupling pins even when they are not precisely alined with the sockets. The side wall members 33 are also flared outwardly at their back ends to compensate for any lateral misalinement of the structure carrying the coupling pins.

Provision is made for releasably locking the coupling pins 37 in the sockets in the coupling members to afford a positive connection between the hitch frame and the tractor. The locking means as shown in FIGS. 5 and 6 comprises a shaft 38 supported for pivoting movement in alined apertures in the side walls 33 of the coupling member. Pinned or otherwise nonrotatably fixed to each end of the shaft is a hook-shaped latch dog 39 adapted to swing along the outer face of the adjacent side wall of the member and across the notch 36 therein. Each dog has a downwardly opening recess 40 in its lower face shaped to embrace the coupling pin 37 as shown in FIG. 6 when it is seated within the socket and operative to retain the pin therein.

A torsion spring 41 secured to an arm 42 rigid with the shaft 38 yieldably urges the shaft and latch dogs to the locking position. To permit the coupling to be effected by simply backing up the tractor to the harvester, the latch dogs are formed with sloping cam surfaces 43 at their forward ends effective to rock the dogs upwardly when engaged by the pins. Manual retraction of the latch dogs to permit detachment of the harvester from the tractor is effected by means of a hand lever 44 fixed to the shaft 38 and projecting radially therefrom.

The frame 30 in its preferred form comprises a heavy tubular cross member 45 dimensioned to extend across the back of the tractor and in this instance beyond one of the tractor drive wheels as shown in FIG. 1. It will be understood that the cross member can be dimensioned to extend beyond both tractor drive wheels and thus adapted to support a second gathering unit if desired. A pair of coupling pin carrying arms 46 are each welded at one end to the cross member and at their other ends carry the coupling pins 37 with their axes disposed horizontally and transverse to the longitudinal axis of the harvester. The arms 46 are spaced apart longitudinally of the cross member so as to aline with the coupling members 31. They may be conveniently formed from channel members assembled face-to-face and dimensioned laterally to slide between the side walls 33 of the coupling members. It will be observed that the pins 37 are long enough to project at both sides of the carrying arm for engagement in the sockets formed by the notches 36.

Cooperating with the coupling members 31 and the arms 46 to support the frame rigidity with respect to the tractor are a pair of links or braces 47, 48 adapted to be connected between the frame and the tractor in the mounting operation. The connections with the frame are effected by pins 49 (FIG. 4) carried by brackets 50 welded to the cross member 45, the pins engaging in sockets at the ends of the links. The links are also formed with sockets at their other ends for attachment to the tractor by means of a long pin 51 inserted through alined holes in lugs 52 conventionally provided on the tractor center housing. One of the links, for example, the link 48, is preferably constructed in two sections connected by a turn buckle 53 to provide for adjustment of its effective length and thus facilitate alinement of the frame with the tractor.

An additional connection between the tractor and the frame is provided by an upright strut formed in this instance by a pair of elongated flat bars 55 secured at their lower ends to a channel-shaped bracket 56 welded to and extending forwardly from the cross member 45 substantially midway between the arms 46. The bars 55 converge toward their upper ends which are spaced apart to receive between them the socketed rear end of the tractor top link 28. A pin 55a inserted through alined apertures in the bars and through the socket in the top link secures the parts in place. The bars 55 also serve as an anchorage for a brace 57 (FIG. 2) for supporting the conveyor 18.

Figure 4:
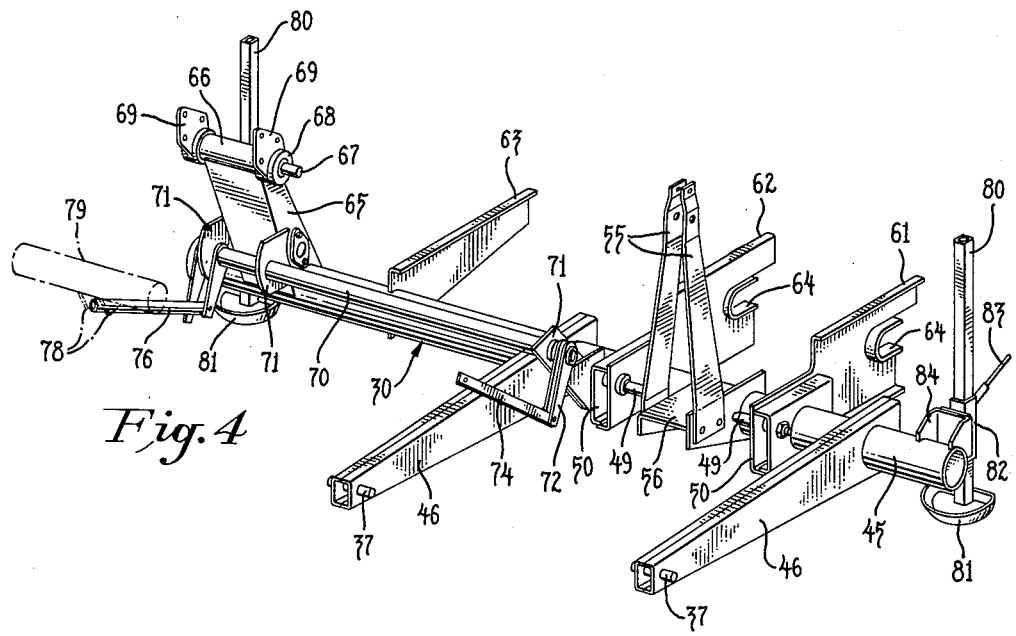
FIG. 4 is a perspective view of the frame and coupling elements constituting a part of the hitch structure attached to the implement.

For supporting the husking unit 15 of the harvester, the frame 30 includes a series of brackets 61, 62 and 63 spaced apart longitudinally of and welded or otherwise rigidly secured to the cross member 45 as shown in FIGS. 1 and 4. The brackets extend rearwardly from the cross member and each has its upper edge flanged over to provide a mounting surface for the housing 16 of the husking mechanism. Brackets 61 and 62 are located relatively close together intermediate the arms 46 and are formed with rearwardly opening sockets 64 for the reception of mounting pins provided on the conveyor 18. The sockets, together with the brace 57, effectively support the conveyor.

To permit the swinging of the front or gathering unit 10 of the harvester from the working position in which it is shown in FIG. 2 to a transport position with its front end raised substantially above the ground level, the frame 30 provides a pivotal mounting for that unit. For this purpose, a rigid boxlike standard 65 is welded or otherwise secured to the cross member 45 to project upwardly and generally forward therefrom as shown in FIG. 2. The standard is located adjacent the end of the cross member to the right of the mounting brackets and in a position to support the gathering section 10 alongside the tractor and outwardly of the adjacent rear drive wheel.

At its upper end the standard 65 carries a tubular housing 66 supporting a cross shaft 67 projecting at opposite ends to engage in bearings 68 carried on the gathering section 10. As shown in FIG. 2, the bearings are secured to the gathering section by means of brackets 69 bolted or otherwise attached to a rearwardly extended portion of the gathering section.

The improved hitch structure includes means by which the front end of the gathering unit may be raised from the ground by the power operated lift on the tractor. This means includes a rock shaft 70 rotatably supported in a series of brackets 71 rigid with and projecting forwardly from the cross member 45 as shown in FIG. 4. A radially projecting crank arm 72 on the inner end of the shaft is connected by a tension link 73 with one of the lift arms 27 on the tractor lift shaft 26. As shown in FIG. 3, this tension link may comprise one of the regular tractor drop links with an extension link 74 connected between its lower end and the crank arm 72.

Figure 7:
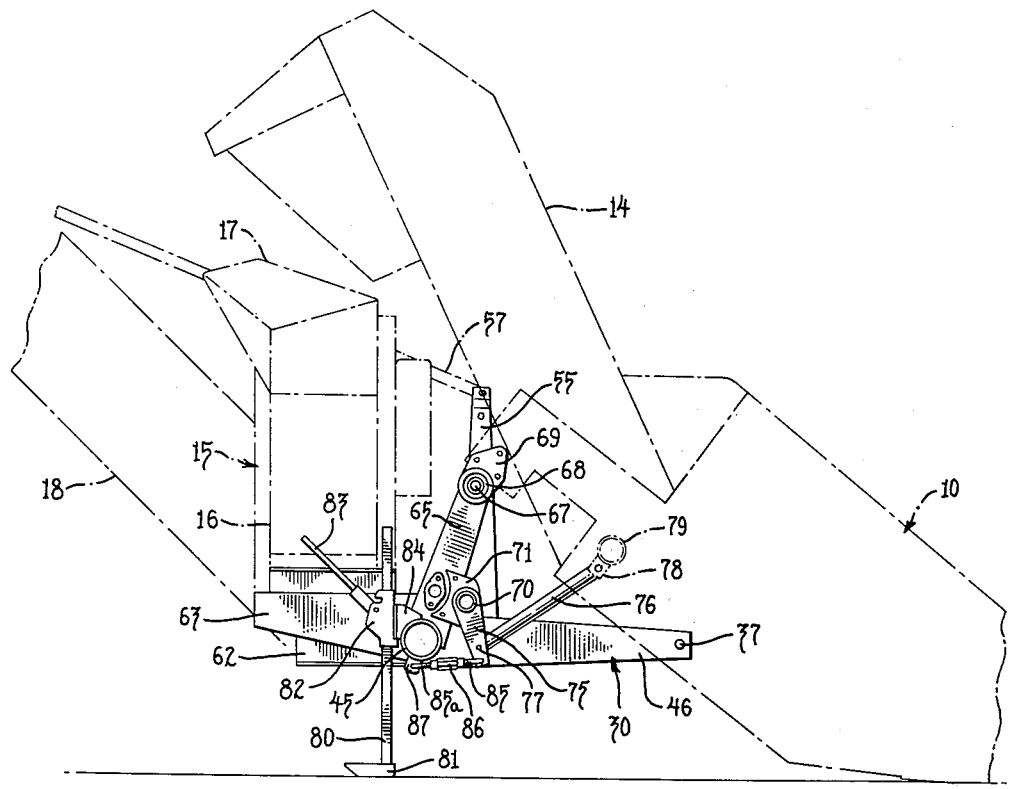
FIG. 7 is a fragmentary side elevational view of the harvester as it stands detached from the tractor.
Figure 8:
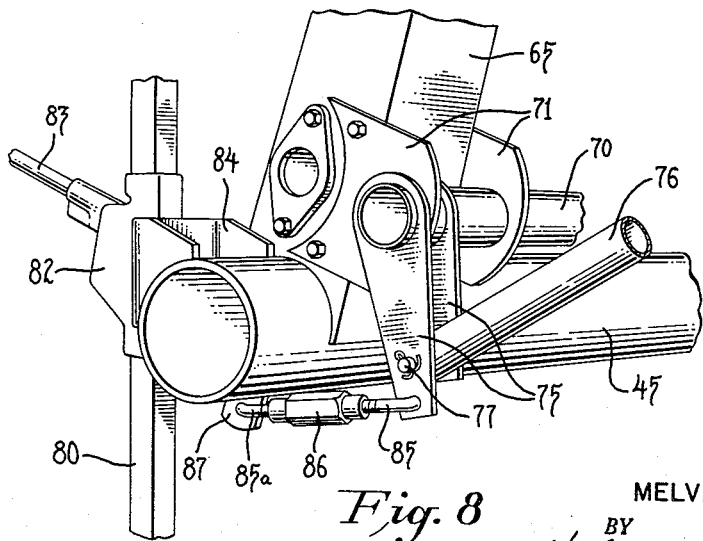
FIG. 8 is an enlarged fragmentary perspective view of the frame showing the manner in which the front and rear units of the harvester are secured against relatively pivoting movement when detached from the tractor.

At its other end the shaft 70 is fitted with a pair of projecting arms 75 (FIG. 8) spaced apart to receive one end of a tubular thrust link 76. The thrust link is pivotally secured to the arms as by a pin 77 and is extended to and pivotally connected to a bracket 78 rigid with a cross member 79 (FIGS. 4 and 7) forming a part of the framework of the gathering unit 10. As will be seen by reference to FIG. 7, the cross member 79 is located substantially forwardly of the pivot shaft 67 for the unit so that the rock shaft and thrust link are effective to swing the unit upwardly about its pivot and lift the gathering points 11, 11a from the ground when the lift shaft of the tractor is rocked in a hitch raising direction.

Retractable supports are provided on the frame 30 for cooperation with the gathering unit 10 in supporting the harvester when it is detached from the tractor and maintaining it in a position so that it may be easily remounted on the tractor. The retractable supports as shown are in the form of jacks, each having an elongated standard 80 with an enlarged ground engaging foot 81 at its lower end. Each standard extends through the usual head 82 enclosing pawl and ratchet mechanism by which the head and standard may be relatively shifted axially of the standard by operating a hand lever 83 with a pumping motion. The heads 82 of the jacks, in this instance, are rigidly secured to brackets 84 respectively welded to the cross member 45 adjacent opposite ends. The jacks when pumped down accordingly provide two points of support for the rear portion of the harvester.

When the harvester is to be detached from the tractor the retractable jacks are lowered until their feet 81 are on the ground and the jacks are adjusted to relieve the load on the tractor. The front section of the gathering unit 10 is lowered until the points 11, 11a rest on the ground. Link sections 73, 74 are then disconnected and top link 28 is released from the strut 55. Stay braces 47 and 48 are next removed by withdrawal of the pin 51. The gathering unit and husking unit 15 are then locked together as a rigid unit to prevent relative pivoting of the units so that the harvester has three-point support on the two jacks and the front portion of the gathering unit. Such locking is effected by means of an extensible link comprising a pair of short rods 85, 85a having their adjacent ends oppositely threaded and screwed into a similarly threaded nut 86. The outer ends of the rods are bent over to form hooks engageable respectively in apertures in one of the arms 75 and in a stationary arm 87 rigid with the cross member 45. Upon release of the pins 37 from the latch dogs 39 by actuation of the levers 44, the tractor may be driven forwardly, leaving the harvester standing free.

To remount the harvester on the tractor, the above steps are carried on in the reverse order. In case the arms 46 or mounting pins 37 which they carry do not accurately aline with the notches 36 due, for example, to the harvester support settling in soft ground, they may be realined quickly and easily either by manipulation of the jacks or by screwing up the nuts 86. The latter operation effects a relative pivoting of the front and rear harvester sections which swings the arms 46 and pins 37 upwardly. When proper alinement of the pins 37 and sockets 36 is attained, the tractor is simply backed up to engage the pins in the sockets and the various links and braces are reconnected between the tractor and the frame 30.

It will be apparent from the foregoing that the invention provides a novel and advantageous hitch structure which enables a row crop harvester to be mounted on or detached from a tractor by one man. Moreover, such mounting or detachment may be effected without requiring manhandling of the harvester. Coupling elements provided on the harvester may be readily adjusted to aline with cooperating elements of the tractor by manipulation of jack type supports provided on the harvester frame or by varying the effective lengths of a link provided for locking the two harvester sections together against pivoting movement.

The improved hitch structure is simple and sturdy in construction and it includes a minimum number of parts that require permanent mounting on the tractor. Those parts are compact and in no way interfere with the normal operation of the tractor when the harvester is detached. Additionally, the improved hitch structure permits use of the power operated lift of the tractor for raising and lowering the gathering unit of the harvester between working and transport positions.

I claim as my invention:

1. A hitch structure for coupling a tractor having power operated lift with a row crop harvester having a gathering unit adapted to extend alongside the tractor and a crop treating unit disposed behind the tractor, said hitch structure comprising, in combination, a frame including a transverse member, coupling means on said member cooperating with coupling means adapted to be mounted on the tractor for releasably connecting said member to the tractor with the member extending transversely and projecting at one side of the tractor, means on said member supporting the crop treating unit, a standard rigid with said member disposed adjacent its projecting portion, means on said standard pivotally supporting the gathering unit for movement about a transverse horizontal axis, a shaft rotatably supported on said transverse member, a crank arm connected to said shaft, a tension link adapted to operatively connect said crank arm with the tractor power lift, a second crank arm connected to said shaft, a thrust link connecting said second crank arm with the gathering unit forwardly of its pivot and operative when connected to raise the forward end of the unit upon rocking of said shaft, an arm rigid with and projecting radially from said transverse member, and a link detachably connected between said arm and said second crank arm operative to maintain the gathering unit in a fixed position relative to the frame with its forward end resting on the ground.

2. A hitch structure as defined in claim 1 in which the link is constructed in sections adjustable relative to each other to change the angular relation between the frame and the shaft and thereby vertically adjust the position of the coupling means on the frame.

3. A hitch structure as defined in claim 1 in which the coupling means releasably connecting the frame member to the tractor comprises a pair of coupling members secured to said frame member and each including a coupling pin, complemental members adapted to be mounted on the tractor defining sockets for receiving the pins of the coupling members, and latch means on said complemental members engageable with the pins to positively retain them in the sockets.

References Cited in the file of this patent

UNITED STATES PATENTS

| | | |
|---|---|---|
| 2,346,330 | Ratcliff | Apr. 11, 1944 |
| 2,834,171 | Aber | May 13, 1958 |
| 2,849,850 | O'Donnell et al. | Sept. 2, 1958 |